United States Patent
Tang

(10) Patent No.: US 8,117,658 B2
(45) Date of Patent: Feb. 14, 2012

(54) ACCESS POINT, MOBILE STATION, AND METHOD FOR DETECTING ATTACKS THEREON

(75) Inventor: Cheng-Wen Tang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 582 days.

(21) Appl. No.: 12/411,351

(22) Filed: Mar. 25, 2009

(65) Prior Publication Data

US 2010/0054221 A1  Mar. 4, 2010

(30) Foreign Application Priority Data

Sep. 4, 2008  (CN) .......................... 2008 1 0304369

(51) Int. Cl.
G06F 11/00 (2006.01)
(52) U.S. Cl. .................. 726/23; 726/3; 726/22
(58) Field of Classification Search .................. 726/2, 3, 726/4, 21, 22, 23; 370/310, 328, 338
See application file for complete search history.

(56) References Cited

U.S. PATENT DOCUMENTS

| 7,409,715 | B2 | 8/2008 | Gariador et al. |
| 2003/0185244 | A1 | 10/2003 | Wu et al. |
| 2004/0103307 | A1* | 5/2004 | Raphaeli et al. ............. 713/201 |
| 2007/0097904 | A1 | 5/2007 | Mukherjee et al. |
| 2008/0043686 | A1 | 2/2008 | Sperti et al. |
| 2009/0327736 | A1* | 12/2009 | Cam-Winget et al. ........ 713/181 |

FOREIGN PATENT DOCUMENTS

| TW | I258286 | 7/2006 |
| TW | 200715885 | 4/2007 |
| TW | 200715885 A * | 4/2007 |

* cited by examiner

*Primary Examiner* — Chi Pham
*Assistant Examiner* — Weibin Huang
(74) *Attorney, Agent, or Firm* — Altis Law Group, Inc.

(57) ABSTRACT

A mobile station (STA) communicates with a WLAN device over a communication system includes a storage system, at least one processor, a detection module, an address determination module, a transmission module, and a response module. The STA detects a MAC management protocol data unit (MMPDU) over the communication system, determines whether the MMPDU comprises a spurious data frame posing as the STA to the WLAN device, based at least partly on a comparison of a source address and a destination address of the MMPDU with network addresses of the STA and the WLAN device, respectively, transmits a request data frame having a highest priority in a current connection state to the WLAN device, and determines whether the WLAN device has been attacked based on whether a response data frame is received from the WLAN device.

19 Claims, 3 Drawing Sheets

ACCESS POINT, MOBILE STATION, AND METHOD FOR DETECTING ATTACKS THEREON

BACKGROUND

1. Technical Field

Embodiments of the present disclosure relate to wireless communications, and particularly, to an access point, a mobile station, and a method for detecting attacks thereon.

2. Description of Related Art

Referring to FIG. 3, a wireless communication system 100 is shown, comprising a plurality of access points (APs) 10', mobile stations (STAs) 20', and potential attackers 30. When an AP 10' and an STA 20' communicate, and one receives a disassociation or deauthentication frame from the other, the AP 10' and the STA 20' must reassociate or reauthenticate with each other, or even roam.

However, if either the disassociation frame or the deauthentication frame is a spurious data frame transmitted by one of the attackers 30, posing as the STA 20' or the AP 10', the conventional AP 10' and the conventional STA 20', unaware of the presence of the attacker 30, may be susceptible to attack thereby. Accordingly, it is desirable to provide an STA, an AP, or a method for detecting attacks brought by the spurious deauthentication or deassociation frames.

DETAILED DESCRIPTION

Figure 1:
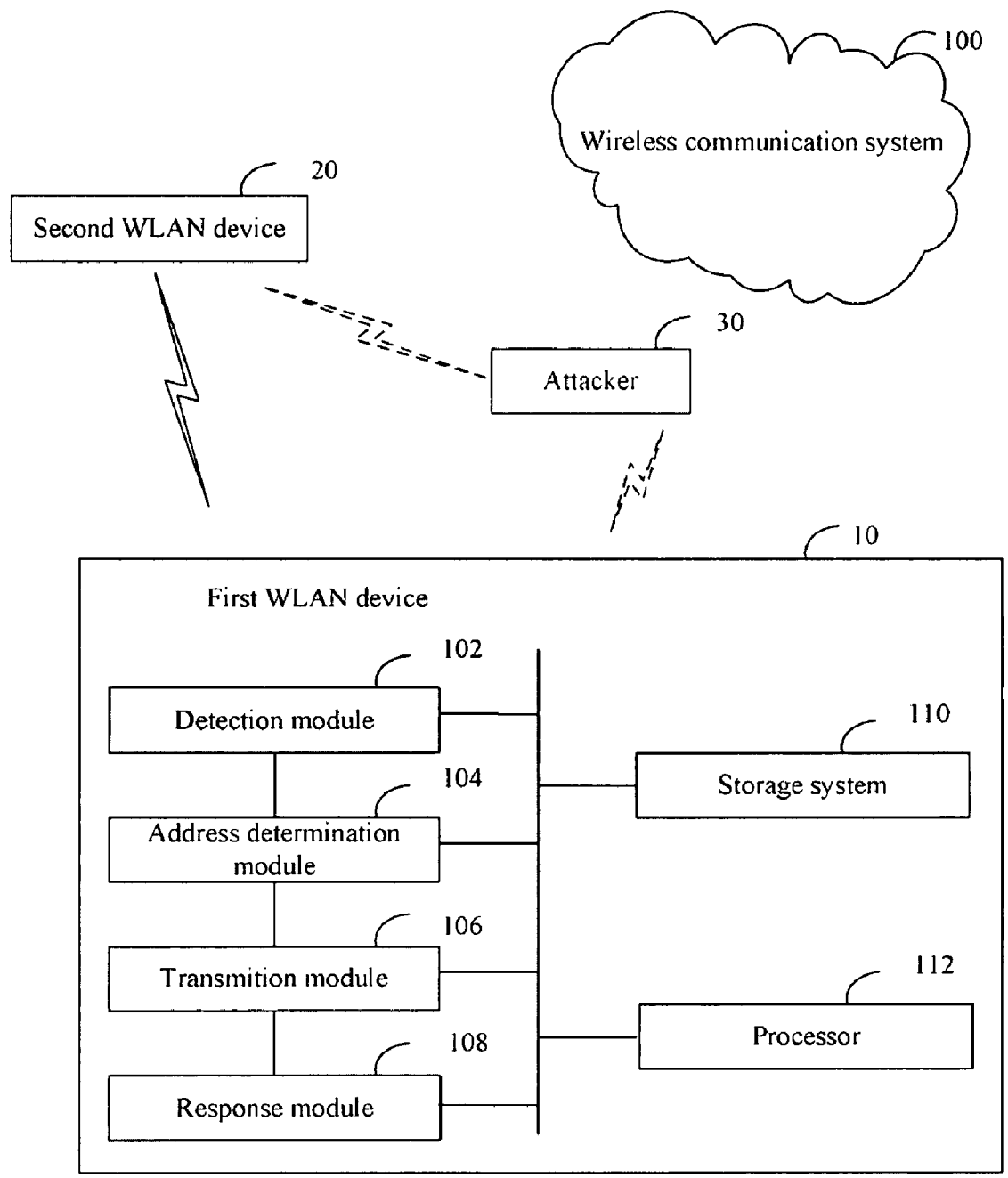
FIG. 1 is a block diagram of an embodiment of a first wireless local area system (WLAN) device in a wireless communication system, according to the present disclosure.

Referring to FIG. 1, a block diagram of an embodiment of a first wireless local area network (WLAN) device 10 shows the first WLAN device 10 wirelessly communicating with a second WLAN device 20 over the wireless communication system 100. The first WLAN device 10 and the second WLAN device 20 may be both mobile stations (STAs), or an access point (AP) and an STA, respectively, or an STA and an AP, respectively. When the first WLAN device 10 communicates with the second WLAN device 20, a potential attacker 30 can create and transmit a spurious data frame posing as the first WLAN device 10 to the second WLAN device 20, interrupting communication between the first WLAN device 10 and the second WLAN device 20. The spurious data frame may be a spurious media access control (MAC) management protocol data unit (MMPDU).

In the illustrated embodiment, the first WLAN device 10 comprises a detection module 102, an address determination module 104, a transmission module 106, and a response module 108. The first WLAN device 10 further comprises a storage system 110 storing the modules 102, 104, 106, 108, and a processor 112 that executes at least one computerized instruction for the modules 102, 104, 106, 108.

The detection module 102 is configured for detecting an MMPDU transmitted over the wireless communication system 100. As it is known, there are many kinds of MMPDUs, such as an association frame and a disassociation frame. In one embodiment, the MMPDU mainly mentions a disassociation frame or a deauthentication frame.

The address determination module 104 is configured for determining whether the MMPDU comprises a spurious data frame posing as the first WLAN device 10 to the second WLAN device 20. In one embodiment, the above-mentioned determination is based at least partly on a comparison of a source address and a destination address of the MMPDU detected by the detection module 102 with network addresses of the first WLAN device 10 and the second WLAN device 20, respectively. The attacker 30 transmits the spurious data frame posing as the first WLAN device 10 to the second WLAN device 20. The source address and the destination address of the MMPDU and the network addresses of the first WLAN device 10 and the second WLAN device 20 are MAC addresses, in one embodiment.

The transmission module 106 is configured for instantly transmitting a request data frame having a highest priority in a current connection state between the first WLAN device 10 and the second WLAN device 20 to the second WLAN device 20 if the MMPDU is a spurious data frame. The detection module 102 will continue detection of the MMPDU, if the MMPDU is not a spurious data frame.

The connection state between the first WLAN device 10 and the second WLAN device 20 comprises an authentication state, a disassociation state, an associated state, a deauthentication state, and a data communication state. In one embodiment, the current connection state above-mentioned mainly comprises a disassociation state and a deauthentication state. The request data frame having the highest priority in the current connection state here comprises an association frame in the disassociation state and a deauthentication frame in the deauthentication state.

The response module 108 is configured for determining whether the second WLAN device 20 is under attack by the attacker 30 according to whether the response module 108 receives a response data frame from the second WLAN device 20 after the transmission module 106 transmits the request data frame having the highest priority in the current connection state. If the response module 108 receives the response data frame from the second WLAN device 20, the response module 108 determines that the second WLAN device 20 is under attack by the attacker 30. If the response module 108 does not receive any response data frame from the second WLAN device 20, the response module 108 determines the second WLAN device 20 is not under attack by the attacker 30. The response data frame is only generated when the second WLAN device 20 receives a request data frame to associate or authenticate with the first WLAN device 10.

Figure 2:
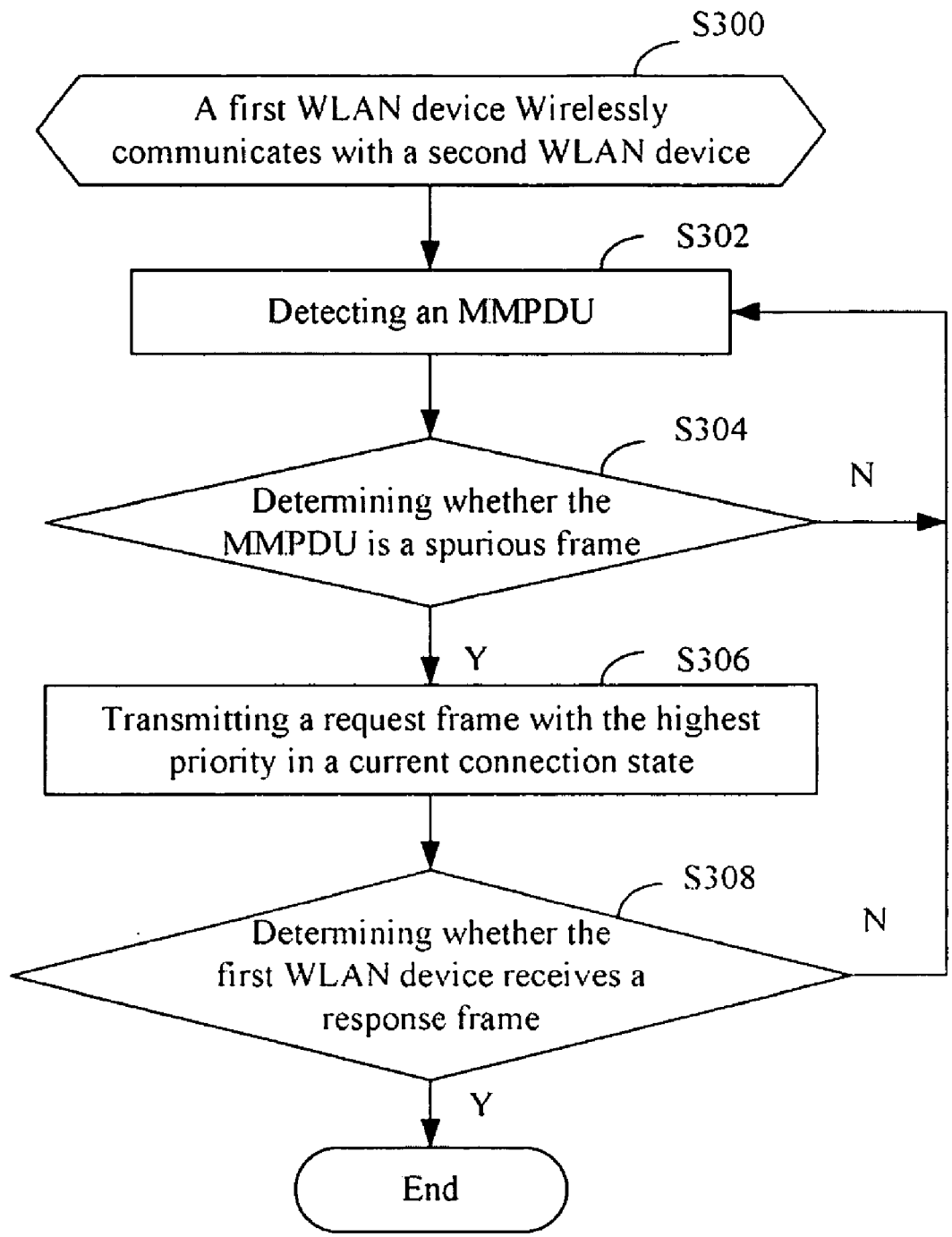
FIG. 2 is a flowchart of an embodiment of a method for the first WLAN device to determine whether a second WLAN device is under attack, according to the present disclosure.
Figure 3:
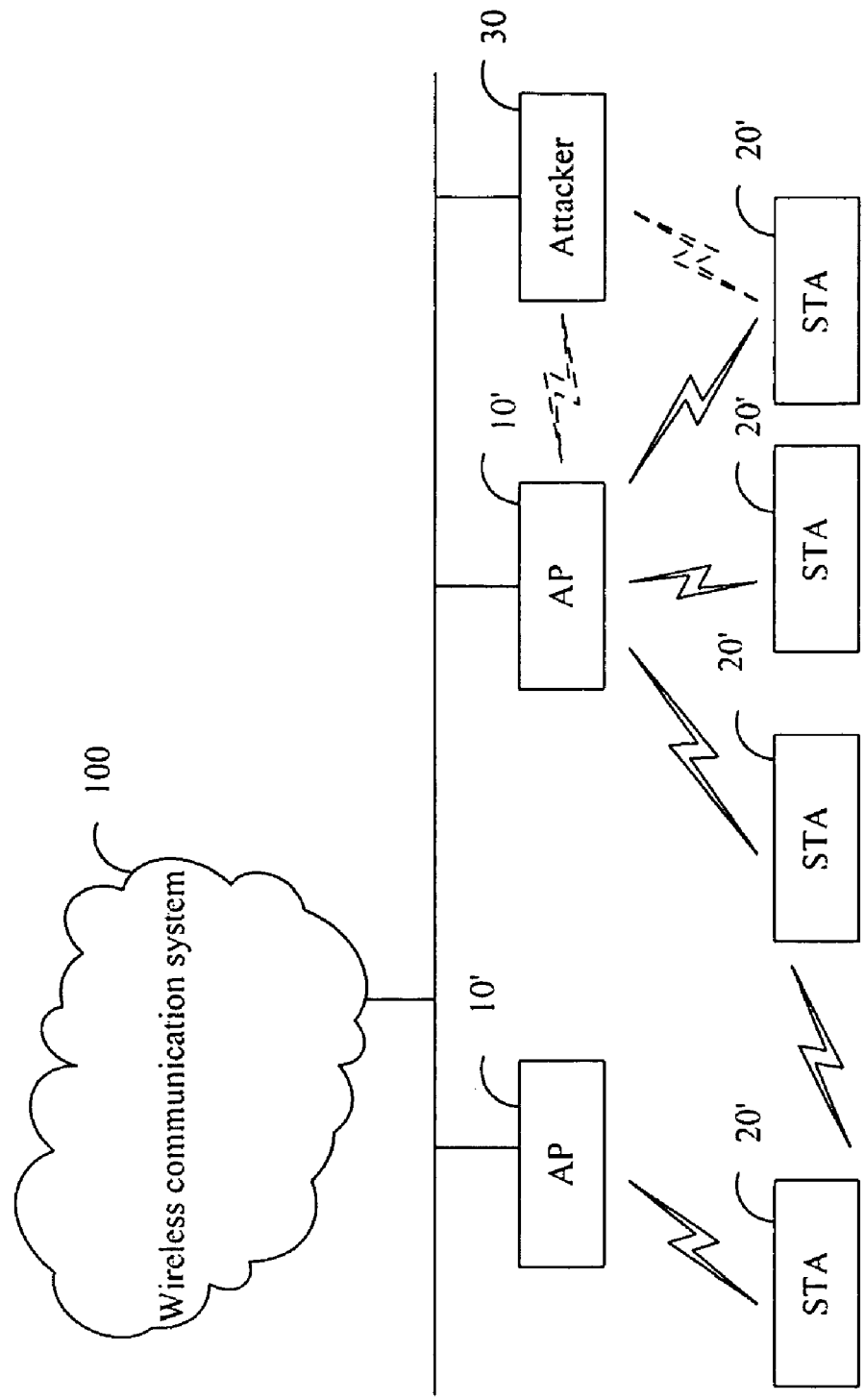
FIG. 3 depicts a schematic diagram of a widely used wireless communication system.

FIG. 2 is a flowchart of an exemplary embodiment of a method of the first WLAN device 10 determining whether the second WLAN device 20 is under attack, the method performed by the function modules of FIG. 1.

In block S300, the first WLAN device 10 wirelessly communicates with the second WLAN device 20. The potential attacker 30 may attack the second WLAN device 20 by a spurious data frame posing as the first WLAN device 10, so as to interrupt communication between the first WLAN device 10 and the second WLAN device 20.

In block S302, the detection module 102 detects an MMPDU over the communication system 100.

In block S304, the address module 104 determines whether the MMPDU is a spurious data frame. In one embodiment, the above-mentioned determination is based at least partly on a comparison of a source address and a destination address of the MMPDU respectively with network addresses of the first WLAN device 10 and the second WLAN device 20. If the source address and the destination address of the MMPDU are the same as those of the first WLAN device 10 and the second WLAN device 20, the address determination module 104 determines the MMPDU is spurious. If not, the address determination module 104 determines that the MMPDU is not spurious. In one embodiment, the source address and the destination address of the MMPDU and the network address of the STA and the network address of the WLAN device are MAC addresses.

If the first WLAN device 10 receives no spurious data frames, block S302 is executed, in which the detection module 102 continues detection of the MMPDU.

If the first WLAN device 10 receives the spurious data frame, block S306 is repeated, wherein transmission module 106 transmits a request data frame having a highest priority in a current connection state between the first WLAN device 10 and the second WLAN device 20.

The connection state between the first WLAN device 10 and the second WLAN device 20 comprises an authentication state, a disassociation state, an associated state, a deauthentication state, and a data communication state. In one embodiment, the current connection state above-mentioned mainly comprises a disassociation state and a deauthentication state. The request data frame having the highest priority in the current connection state comprises an association frame in the disassociation state and a deauthentication frame in the deauthentication state.

In block S308, the response module 208 determines whether the first WLAN device 10 has received the response data frame from the second WLAN device 20.

If the first WLAN device 10 receives no response data frame, the response module 208 determines no attack has been attempted, and block S302 is executed, in which the detection module 102 continues detection of the MMPDU.

If the first WLAN device 10 receives the response data frame from the second WLAN device 20, the response module 208 determines that the second WLAN device 20 is currently under attack.

Thus, the first WLAN device 10 detects attacks via spurious data frame representations from attackers 30.

The description of the present disclosure has been presented for purposes of illustration and description, and is not intended to be exhaustive or limited to the forms disclosed. Many modifications and variations will be apparent to those of ordinary skill in the art. Various embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A mobile station for communicating with a wireless local area network (WLAN) device over a communication system, the mobile station comprising: a storage system; at least one processor; and one or more modules, wherein the one or more modules are stored in the storage system and configured to be executed by the at least one processor, the one or more modules comprising: a detection module configured for detecting a media access control (MAC) management protocol unit (MMPDU) over the communication system between the mobile station and the WLAN device; an address determination module configured for determining whether the MMPDU comprises a spurious data frame posing as the mobile station to the WLAN device, wherein the determination is based at least partly on a comparison of a source address and a destination address of the MMPDU with a network address of the mobile station and a network address of the WLAN device, respectively; a transmission module configured for transmitting a request data frame having a highest priority in a current connection state between the WLAN device and mobile station to the WLAN device; and a response module configured for determining whether the WLAN device is under attack by the spurious data frame according to whether the response module has received a response data frame from the WLAN device.

2. The mobile station as claimed in claim 1, wherein the source address and the destination address of the MMPDU, the network address of the mobile station, and the network address of the WLAN device are MAC addresses.

3. The mobile station as claimed in claim 1, wherein the current connection state comprises a disassociation state and a deauthentication state.

4. The mobile station as claimed in claim 3, wherein the request data frame having a highest priority comprises an association frame in the disassociation state, and an authentication frame in the deauthentication state.

5. The mobile station as claimed in claim 1, wherein the MMPDU comprises a disassociation frame and a deauthentication frame.

6. The mobile station as claimed in claim 1, wherein the response module determines that the WLAN device is under attack by an attacker by receipt of the response data frame from the WLAN device, and wherein the response module determines that the WLAN device is not under attack by the attacker when the response module receives no response data frame from the WLAN device.

7. The mobile station as claimed in claim 1, wherein the WLAN device is a mobile station or access point.

8. An access point for communicating with a mobile station over a communication system, the access point comprising:
   a storage system;
   at least one processor; and
   one or more modules, wherein the one or more modules are stored in the storage system and configured to be executed by the at least one processor, the one or more modules comprising:
   a detection module configured for detecting a media access control (MAC) management protocol data unit (MMPDU) over the communication system between the access point and the mobile station;
   an address determination module configured for determining whether the MMPDU comprises a spurious data frame posing as the access point to the mobile station, wherein the determination is based at least partly on a comparison of a source address and a destination address of the MMPDU with a network address of the access point and a network address of the mobile station, respectively;
   a transmission module configured for transmitting a request data frame having a highest priority in a current connection state between the access point and the mobile station to the mobile station when that the MMPDU is the spurious data frame; and
   a response module configured for determining whether the mobile station is under attack by the spurious data frame according to whether the response module receives a response data frame from the mobile station.

9. The access point as claimed in claim 8, wherein the source address and the destination address of the MMPDU, the network address of the access point and the network address of the mobile station are MAC addresses.

10. The access point as claimed in claim 8, wherein the current connection state comprises a disassociation state and a deauthentication state.

11. The access point as claimed in claim 10, wherein the request data frame having the highest priority comprises an association frame in the disassociation state, and an authentication frame in the deauthentication state.

12. The access point as claimed in claim 8, wherein the MMPDU comprises a disassociation frame and a deauthentication frame.

13. The access point as claimed in claim 8, wherein the response module determines the mobile station is under attack by the response module receiving the response data frame from the mobile station and wherein the response module determines that the mobile station is not under attack when the response module does not receive the response data frame from the mobile station.

14. A method of a first wireless local area network (WLAN) device determining whether a second WLAN device is under attack by a potential attacker over a communication system, the method comprising:

the first WLAN device detecting a media access control (MAC) management protocol data unit (MMPDU) over the communication system between the first WLAN device and the second WLAN device;

the first WLAN device determining whether the MMPDU comprises a spurious data frame posing as the first WLAN device to the second WLAN device, wherein the determination is based at least partly on the comparison of a source address and a destination address of the MMPDU with network addresses of the first WLAN device and the second WLAN device, respectively;

wherein, if the MMPDU is the spurious data frame, the first WLAN device transmits a request data frame having a highest priority in a current connection state between the first WLAN device and the second WLAN device to the second WLAN device; and the first WLAN device determines whether a response data frame is received from the second WLAN device; and if the response data frame is received from the second WLAN device, the first WLAN device determines that the second WLAN device is under attack; or if no response data frame is received from the second WLAN device, the first WLAN device determines that the second WLAN device is not under attack.

15. The method as claimed in claim 14, wherein the source address and the destination address of the MMPDU and the network addresses of the first WLAN device and the second WLAN device are MAC addresses.

16. The method as claimed in claim 14, wherein the current connection state comprises a disassociation state and a deauthentication state.

17. The method as claimed in claim 16, wherein the request data frame having the highest priority is an association frame when the current connection state is the disassociation state, and the request data frame with the high priority is an authentication frame when the current connection state is the deauthentication state.

18. The method as claimed in claim 17, wherein the MMPDU comprises a disassociation frame and a deauthentication frame.

19. The method as claimed in claim 18, wherein transmission of the highest priority frame in a current connection state to the second WLAN device comprises:

the first WLAN device determining the current connection state;

the first WLAN device transmitting the association frame if the current connection state is the disassociation state; or the first WLAN device transmitting the authentication frame if the current connection state is the deauthentication state.

* * * * *